United States Patent [19]
Tomita et al.

[11] 3,767,567
[45] Oct. 23, 1973

[54] PROCESS FOR PREPARING OLEFINS

[75] Inventors: Tadayoshi Tomita, Yokohama;
Katsutoshi Kikuchi, Fujisawa;
Takayuki Sakamoto, Tokyo, all of
Japan

[73] Assignee: Toyo Engineering Corporation,
Chiyoda-ku, Tokyo, Japan

[22] Filed: Nov. 22, 1971

[21] Appl. No.: 200,858

[52] U.S. Cl. ............................. 208/122, 260/683.3
[51] Int. Cl. ............................................ C10g 11/02
[58] Field of Search ................ 208/122; 260/683.3, 260/683 R

[56] References Cited
UNITED STATES PATENTS

| | | | |
|---|---|---|---|
| 2,469,420 | 5/1949 | Thacker | 260/683.3 |
| 2,311,979 | 2/1943 | Corson et al. | 260/683.3 |
| 2,289,757 | 7/1942 | Connolly | 208/122 |
| 2,422,172 | 6/1947 | Smith et al. | 260/683.3 |

FOREIGN PATENTS OR APPLICATIONS

| | | | |
|---|---|---|---|
| 305,603 | 2/1929 | Great Britain | 260/683 R |

*Primary Examiner*—Delbert E. Gantz
*Assistant Examiner*—James W. Hellwege
*Attorney*—Woodhams et al.

[57] ABSTRACT

Olefins are manufactured by catalytically cracking a hydrocarbon feedstock by contacting said feedstock with steam at a temperature of 650°–900° C in the presence of a catalyst consisting essentially of at least 20 wt. percent of an oxide selected from the group consisting of beryllium oxide, calcium oxide and strontium oxide and the balance is aluminum oxide.

9 Claims, 1 Drawing Figure

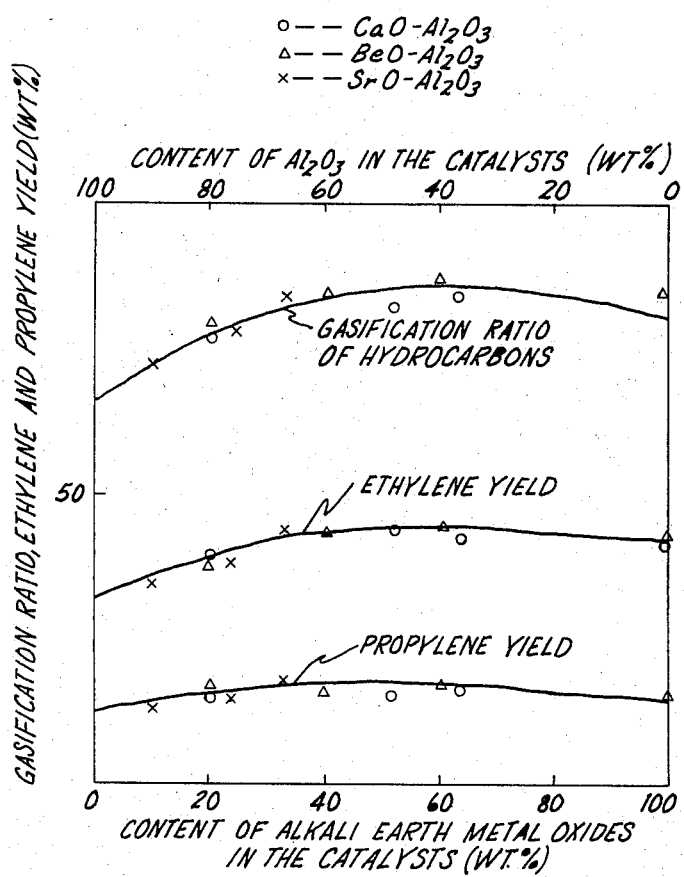

PROCESS FOR PREPARING OLEFINS

CROSS REFERENCE TO RELATED APPLICATION

This application is related to our copending application Ser. No. 178,264 filed Sept. 4, 1971, entitled "Process for Manufacturing Gaseous Mixtures Rich in hydrogen".

BACKGROUND OF THE INVENTION

1. Field of the Invention

This invention relates to the preparation of olefins from gaseous or liquid hydrocarbons. More particularly, this invention relates to the preparation of lower olefins such as ethylene, propylene, butene and butadiene.

2. Description of the Prior Art

The most commonly employed process for preparing lower olefins comprises introducing paraffin hydrocarbons such as ethane, propane and butane or naphtha into an externally heated tube to effect thermal decomposition. In this thermal decomposition process, the thermal decomposition reaction is controlled by varying the composition of the feed materials, the reaction temperature and/or the residence time of the materials in the reaction tube.

About 30 wt. percent of ethylene, based on the amount of the feed materials, has been obtained from, for example, full-range naphtha within a short reaction time by employing a high reaction temperature in order to increase the yield of ethylene. However, such a yield is about the practical upper limit and no higher yield can be expected in the thermal cracking method.

For efficient use of the starting hydrocarbons, there is a need for further improvement in the yield of the product olefins.

The present invention relates to a catalytic process for obtaining desired lower olefins in a high yield at a relatively low reaction temperature.

Various catalytic processes for the preparation of olefins have been reported, but these processes have not been suitable for industrial use because of difficulties in their procedures. Catalytic processes which have been reported up to the present are not suited for the continuous operation required for industrial use because even when light naphtha, which can be relatively easily treated, is used as the starting material, the carbon deposition on the catalyst is remarkably high.

The present invention provides a catalytic cracking process for preparing lower olefins, which process can be carried out for a long period of time without the occurrence of carbon deposition.

We have found previously that calcination products or mixtures of alkaline earth metal oxides, either with or without aluminum oxide, are useful as steam reforming catalysts for obtaining hydrogen-rich gases from hydrocarbons. In the course of the development of these steam reforming catalysts, we have also found that these catalysts can be used, with excellent results, in the preparation of olefins if the reaction conditions are selected properly. This unexpected result is probably due to the property of the catalysts of preventing carbon deposition and of the property thereof of controlling the dehydrogenation reaction of the feed hydrocarbons.

SUMMARY OF THE INVENTION

The catalyst used in the process of the present invention is a sintered product comprising (1) at least one oxide selected from the group consisting of beryllium oxide, calcium oxide and strontium oxide and (2) aluminum oxide.

Though the functions of the respective catalyst components and the synergism thereof have not been elucidated yet, it is known that the alkaline earth metal oxides such as beryllium oxide, calcium oxide and strontium oxide function to control the dehydrogenation reaction of the feed hydrocarbons and to inhibit the progress of thermal polymerization. Aluminum oxide promotes the reaction of hydrocarbons and steam. If the catalysts are sintered or crystallized, the aluminum oxide is firmly combined with the alkaline earth metal oxides mainly in a spinel-like structure to increase the mechanical strength of the final molded catalyst.

It has been proposed in the past that at temperatures above 600° C., a catalyst of the foregoing type is inactivated due to a rapid decrease in the hydrogen ion concentration on the surface of the catalyst with the result being that the catalyst acts as a mere heat transfer medium on the reactants. However, it is considered that the function of preventing carbon deposition by controlling the dehydrogenation reaction of hydrocarbons is due to the function of the outer shell electrons of the atoms constituting the catalyst and that excitation of the outer shell electrons is rather promoted at high temperature. Consequently, the function of preventing carbon deposition becomes remarkable at high temperatures. In this connection, we know from experience that acid substances such as silicon oxide promote carbon deposition so that such substances should not be present in the catalyst used in this invention.

In the catalyst composition used in the process of the present invention, the capacity of alkaline earth metal oxides to prevent carbon deposition is reduced as the aluminum oxide content in the catalyst increases. Accordingly, the catalyst according to the present invention contains (1) at least 20 wt. percent of alkaline earth metal oxide or oxides and (2) the balance, i.e., not in excess of 80 wt. percent, consist essentially of aluminum oxide.

FIG. 1 shows the gasification ratio of hydrocarbon, ethylene and propylene yield in connection with the content of alkali earth metal oxides or aluminum oxide in the catalyst.

Herein,

Gasification ratio of hydrocarbons = Weight of hydrocarbons below $C_4$ in the product gas/Weight of supplied hydrocarbons × 100

Ethylene yield = Weight of ethylene in the product gas/Weight of supplied hydrocarbons × 100

Propylene yield = Weight of propylene in the product gas/Weight of supplied hydrocarbons × 100

Naphtha having 180° C end boiling point is used as supplied hydrocarbons under the cracking condition such as 760° C of reaction temperature, 1.0 of $H_2O/C$ ratio and 0.5 second of residence time.

FIG. 1 shows that 20 wt. percent, preferably 30 wt. percent, of alkali earth metal oxide in the catalyst are effective.

In the process of the present invention, a reaction temperature within the range of 650°–900° C is suitable. When a starting material having a high light hydrocarbon content is used, a relatively high temperature within said range is selected and, on the other hand, when a material of high heavy hydrocarbon content is used, a relatively low temperature within said range is employed.

The space velocity of the stream of reactants, i.e., hydrocarbon feedstock and steam, in the reaction zone is within the range of 5,000–50,000 $Hr^{-1}$, in the process of the present invention.

Table 1 shows the result by varying the residence time in the reactor at the presence of the sintered product obtained from a mixture of calcium oxide and aluminum oxide, as a catalyst.

Catalyst composition:
CaO — 51.5 wt. percent
$Al_2O_3$ — 47.7 wt. percent
others — 0.8 wt. percent
Reaction temperature: 800° C
$H_2O/C$: 0.5
Feed: Naphtha boiling in the range of 70° – 180° C

TABLE 1

| Yield wt. percent | Second 0.1 | 0.3 | 0.5 | 0.7 |
|---|---|---|---|---|
| Hydrogen | 2.2 | 2.4 | 2.5 | 2.6 |
| Methane | 18.5 | 23.8 | 30.0 | 35.5 |
| Ethylene | 38.8 | 38.8 | 36.9 | 35.6 |
| Ethane | 0.8 | 1.0 | 1.1 | 1.4 |
| Propylene | 14.5 | 10.5 | 6.5 | 4.5 |
| Propane | 0.3 | 0.2 | 0.1 | 0.1 |
| $C_4$ Fraction | 5.3 | 4.8 | 4.5 | 4.1 |
| Fraction above $C_4$ | 16.4 | 13.5 | 12.7 | 10.3 |
| Carbon monoxide | 1.6 | 2.3 | 3.2 | 3.5 |
| Carbon dioxide | 13.0 | 15.2 | 15.8 | 16.0 |

The ratio of steam to carbon in the feedstock can be from 0.5 to 10/1, by weight.

Table 2 shows the result by varying $H_2O/C$ in the presence of the sintered product obtained from a mixture of calcium oxide and aluminum oxide as a catalyst. Carbon deposition is not found in any case.

Catalyst composition:
CaO — 51.5 wt. percent
$Al_2O_3$ — 47.7 wt. percent
others — 0.8 wt. percent
Reaction temperature: 760° C
Residence time: 0.5 second
Feed: Naphtha boiling in the range of 70° – 180° C

TABLE 2

| Yield wt. percent | $H_2O/C$ 0.5 | 1.0 | 2.0 | 3.0 |
|---|---|---|---|---|
| Hydrogen | 2.1 | 2.3 | 2.3 | 2.4 |
| Methane | 9.8 | 11.2 | 11.8 | 12.1 |
| Ethylene | 34.2 | 43.0 | 45.1 | 47.8 |
| Ethane | 1.8 | 2.0 | 2.3 | 2.5 |
| Propylene | 15.6 | 14.2 | 13.1 | 12.8 |
| Propane | 0.7 | 0.5 | 0.5 | 0.5 |
| $C_4$ Fraction | 5.2 | 5.0 | 4.7 | 4.5 |
| Fraction above $C_4$ | 27.2 | 19.8 | 16.5 | 11.8 |
| Carbon monoxide | 0.6 | 0.6 | 0.7 | 0.7 |
| Carbon dioxide | 11.8 | 12.5 | 13.6 | 14.1 |

The reaction pressure may be either atmospheric pressure or an elevated pressure. The operating pressure is not critical and can be any pressure between atmospheric and 50 atm.

In the process of the present invention, there is used a reactor having at least one of a fixed catalyst bed, a fluidized catalyst bed and a jetted catalyst bed.

The heat of reaction may be supplied by an external heating system in which the reactor is heated by heat supplied through a heat transfer wall or by an internal heating system in which a proper quantity of oxygen or oxygen rich air is fed into the reactor and heat generated by partial oxidation of the starting materials is used.

The presence of impurities, such as sulfur, in the starting materials does not influence the reaction. Therefore, no limitation on the composition of the starting materials within those ranges normally occurring in conventional petroleum oil materials is necessary. The invention can be practiced with heavy oils, such as crude oil including high sulfur crudes, naphtha, kerosene, light oil fractions derived from crudes and mixtures thereof.

The invention will be further described by the following examples which are given to illustrate, but not limit, the invention.

In the following Examples, the reactor used was a tube of 30 mm. inner diameter and 1,000 mm. length prepared by centrifugal casting and filled with a catalyst in the form of approximately cylindrical pellets of 5 mm. diameter and 5 mm. thickness. The reactor was heated externally through the tube wall.

EXAMPLE 1

Naphtha boiling in the range of 70°–180° C was catalytically cracked in the presence of the sintered product obtained from a mixture of beryllium oxide and aluminum oxide. The results were as follows.

Catalyst composition: BeO 20.1 wt. percent, $Al_2O_3$ 79.8 wt. percent, others 1.1 wt. percent
Temperature of the gas product evolved from the reactor: 720° C
Ratio (by weight) of steam to carbon in the material fed into the reactor: 3:1
Residence time in the reactor: 0.7 second
Composition of resulting gas product (wt. percent based on the starting material):
Hydrogen— 2.2
Methane— 11.1
Ethylene— 50.2
Ethane— 2.1
Propylene— 14.2
Propane— 0.5
$C_4$ fraction— 4.9
Fraction above $C_4$—11.9
Carbon Monoxide —0.4
Carbon dioxide — 12.4

EXAMPLE 2

Four varieties of hydrocarbon, as described below, were catalytically cracked in the presence of the sintered product obtained from a mixture of calcium oxide and aluminum oxide, as a catalyst, to obtain olefins. The results were as follows.

Catalyst composition: CaO 51.5 wt. percent, $Al_2O_3$ 47.7 wt. percent, others 0.8 wt. percent
Temperature of the gaseous product evolved from the reactor: 720° C Ratio (by weight) of steam to carbon in the material fed into the reactor: 3:1
Residence time in the reactor: 0.7 second
Composition of the resulting gas (wt. percent based on the starting material):

a. When ethane of 99.5% purity was used as starting material:
Hydrogen —4.8
Methane—4.0
Ethylene—42.2
Ethane—47.0
Propylene—1.0
Carbon monoxide—0.1
Carbon dioxide—3.5 b. When naphtha boiling in the range of 70–180°C was used as starting material:
Hydrogen—2.3
Methane—12.3
Ethylene—48.4
Ethane—2.4
Propylene—13.4
Propane—0.4
$C_4$ Fraction—4.7
Fraction above $C_4$—12.2
Carbon monoxide—0.6
Carbon dioxide—13.6 c. When a petroleum fraction boiling in the range of 250°–400°C was used as starting material:
Hydrogen—1.3
Methane—9.5
Ethylene—41.3
Ethane—1.8
Propylene—11.2
Propane—0.3
$C_4$ Fraction—6.5
Fraction above $C_4$—15.0
Carbon monoxide—0.8
Carbon dioxide—15.3 d. When Kuwait crude oil was used as starting material:
Hydrogen—1.2
Methane—9.2
Ethylene—38.8
Ethane—1.5
Propylene—10.8
Propane—0.2
$C_4$ Fraction—8.6
Fraction above $C_4$—29.8
Carbon monoxide—0.7
Carbon dioxide—14.9

EXAMPLE 3

Naphtha boiling in the range of 70°–180° C was catalytically cracked in the presence of the sintered product obtained from a mixture of strontium oxide and aluminum oxide as a catalyst. The results were as follows:
Catalyst composition: SrO 49.0 wt. percent, $Al_2O_3$ 50.0 wt. percent, others 1.0 wt. percent
Temperature of the gaseous product evolved from the reactor: 720° C
Ratio (by weight) of steam to carbon in the material fed into the reactor: 3:1
Residence time in the reactor: 0.7 second
Composition of the resulting gas product (wt. percent based on the starting material):
Hydrogen—2.0
Methane—10.6
Ethylene—50.8
Ethane—2.5
Propylene—16.2
Propane—0.7
$C_4$ Fraction—5.7
Fraction above $C_4$—16.0
Carbon monoxide—0.2
Carbon dioxide—9.7

EXAMPLE 4

Naphtha boiling in the range of 70°–180°C was catalytically cracked in the presence of the sintered product obtained from a mixture of beryllium oxide, calcium oxide and aluminum oxide, as a catalyst. The results were as follows:
Catalyst composition: BeO 6.2 wt. percent, CaO 32.8 wt. percent, $Al_2O_3$ 61.0 wt. percent
Temperature of the gaseous product evolved from the reactor: 720° C
Ratio (by weight) of steam to carbon in the material fed into the reactor: 3:1
Residence time in the reactor: 0.7 second
Composition of resulting gas (wt. percent based on the starting material):
Hydrogen—2.1
Methane—10.8
Ethylene—50.5
Ethane—2.6
Propylene—15.8
Propane—0.6
$C_4$ Fraction—5.8
Fraction above $C_4$—15.7
Carbon monoxide—0.2
Carbon dioxide—9.8

EXAMPLE 5

Naphtha boiling in the range of 70°–180°C was catalytically cracked in the presence of the sintered product obtained from a mixture of beryllium oxide, strontium oxide and aluminum oxide, as a catalyst. The results were are follows:
Catalyst composition BeO 6.4 wt. percent, SrO 30.8 wt. percent, $Al_2O_3$ 62.8 wt. percent
Temperature of the gaseous product evolved from the reactor: 720° C
Ratio (by weight) of steam to carbon in the material fed into the reactor: 3:1
Residence time in the reactor: 0.7 second
Composition of resulting gas (wt. percent based on the starting material):
Hydrogen—2.4
Methane—10.8
Ethylene—51.2
Ethane—2.4
Propylene—15.8
Propane—0.6
$C_4$ Fraction—5.8
Fraction above $C_4$—17.0
Carbon monoxide—0.2
Carbon dioxide—9.8

EXAMPLE 6

Naphtha boiling in the range of 70°–180°C was catalytically cracked in the presence of the sintered product obtained from a mixture of calcium oxide, strontium oxide and aluminum oxide, as a catalyst. The results were as follows.
Catalyst composition: CaO 41.4 wt. percent, SrO 19.2 wt. percent, $Al_2O_3$ 39.8 wt. percent
Temperature of the gaseous product evolved from the reactor: 680° C Ratio (by weight) of steam to carbon in the material fed into the reactor: 3:1
Residence time in the reactor: 0.7 second
Composition of resulting gas (wt. percent based on the starting material):
Hydrogen—1.9
Methane—10.2
Ethylene—52.5
Ethane—2.5
Propylene—16.3
Propane—0.7
$C_4$ Fraction—6.5
Fraction above $C_4$—15.2
Carbon monoxide—0.2
Carbon dioxide—9.2

EXAMPLE 7

Naphtha boiling in the range of 70°–180° C was catalytically cracked under pressure in the presence of the sintered product obtained from a mixture of calcium oxide and aluminum oxide, as a catalyst. The results were as follows:

Catalyst composition: CaO 51.5 wt. percent, $Al_2O_3$ 47.7 wt. percent, others 0.8 wt. percent
Temperature of the gaseous product evolved from the reactor: 720° C
Pressure in the reactor: 10 kg/cm² G
Ratio (by weight) of steam to carbon in the material fed into the reactor: 3:1
Residence time in the reactor: 0.7 second
Composition of resulting gas (wt. percent based on the starting material):
Hydrogen—2.4
Methane—18.2
Ethylene—43.5
Ethane—3.1
Propylene—11.8
Propane—0.2
$C_4$ Fraction—4.5
Fraction above $C_4$—12.8
Carbon monoxide—0.8
Carbon dioxide—15.1

EXAMPLE 8

Naphtha boiling in the range of 70°–180°C was catalytically cracked under pressure in the presence of the sintered product obtained from a mixture of calcium oxide, and aluminum oxide, as a catalyst. The results were as follows:

Catalyst composition: CaO 51.5 wt. percent, $Al_2O_3$ 47.7 wt. percent, others 0.8 wt. percent,
Temperature of the gaseous product evolved from the reactor: 720° C
Pressure in the reactor: 30 kg/cm² G
Ratio (by weight) of steam to carbon in the material fed into the reactor: 3:1
Residence time in the reactor: 0.7 second
Composition of resulting gas (wt. percent based on the starting material):
Hydrogen—2.5
Methane—21.3
Ethylene—41.2
Propylene—9.8
Propane—0.1
$C_4$ Fraction—4.5
Fraction above $C_4$—11.9
Carbon monoxide—0.9
Carbon dioxide—18.1

EXAMPLE 9

Naphtha boiling in the range of 70°–180° C was catalytically cracked in the presence of the sintered product obtained from a mixture of beryllium oxide, calcium oxide, strontium oxide and aluminum oxide, as a catalyst. The results were as follows:

Catalyst composition: BeO 4.3 wt. percent, CaO 11.4 wt. percent, SrO 20.8 wt. percent, $Al_2O_3$ 63.6 wt. percent
Temperature of the gaseous product evolved from the supply fed into the reactor: 720° C
Ratio (by weight) of steam to carbon in the material fed into the reactor: 3:1
Residence time in the reactor: 0.7 second
Composition of resulting gas (wt. % based on the starting material):
Hydrogen—2.3
Methane—10.7
Ethylene—51.7
Ethane—2.4
Propylene—15.2
Propane—0.5
$C_4$ Fraction—5.7
Fraction above $C_4$—16.2
Carbon monoxide—0.2
Carbon dioxide—10.0

The embodiments of the invention in which an exclusive property or privilege is claimed are defined as follows:

1. A process for manufacturing olefins by catalytically cracking a feedstock of normally gaseous or liquid hydrocarbons, which comprises contacting said feedstock with steam, the weight ratio of steam/carbon in said feedstock being in the range of 0.5 to 10/1, at a temperature in the range of 650°–900° C. and in the presence of a catalyst consisting essentially of a sintered product containing (1) at least about 20 weight percent of at least one oxide selected from the group consisting of beryllium oxide, calcium oxide and strontium oxide and (2) the balance is aluminum oxide.

2. A process according to claim 1, wherein the sintered catalyst is a mixture of aluminum oxide and beryllium oxide.

3. A process according to claim 1, wherein the sintered catalyst is a mixture of aluminum oxide and calcium oxide.

4. A process according to claim 1, wherein the sintered catalyst is a mixture of strontium oxide and aluminum oxide.

5. A process according to claim 1, wherein the sintered catalyst is a mixture of beryllium oxide, calcium oxide and aluminum oxide.

6. A process according to claim 1, wherein the sintered catalyst is a mixture of beryllium oxide, strontium oxide and aluminum oxide.

7. A process according to claim 1, wherein the sintered catalyst is a mixture of calcium oxide, strontium oxide and aluminum oxide.

8. A process according to claim 1, wherein the sintered catalyst is a mixture of beryllium oxide, calcium oxide, strontium oxide and aluminum oxide.

9. A process according to claim 1, in which the space velocity of the stream of reactants in the reaction zone is in the range of 5,000 to 50,000 $hr^{-1}$.

* * * * *